United States Patent
Stewart (10) Patent No.: US 12,112,540 B2
(45) Date of Patent: Oct. 8, 2024

(54) QUEUE MONITORING IN OCCLUSION CONDITIONS THROUGH COMPUTER VISION

(71) Applicant: Sensormatic Electronics, LLC, Boca Raton, FL (US)

(72) Inventor: Michael C. Stewart, Boca Raton, FL (US)

(73) Assignee: Sensormatic Electronics, LLC, Boca Raton, FL (US)

(*) Notice: Subject to any disclaimer, the term of this patent is extended or adjusted under 35 U.S.C. 154(b) by 280 days.

(21) Appl. No.: 17/497,732

(22) Filed: Oct. 8, 2021

(65) Prior Publication Data

US 2022/0114371 A1  Apr. 14, 2022

Related U.S. Application Data (60) Provisional application No. 63/089,949, filed on Oct. 9, 2020.

(51) Int. Cl.
| | |
|---|---|
| G06V 20/52 | (2022.01) |
| G06F 3/0481 | (2022.01) |
| G06T 7/20 | (2017.01) |
| G06T 7/70 | (2017.01) |
| G06V 10/22 | (2022.01) |
| G06V 20/40 | (2022.01) |
| G06V 40/10 | (2022.01) |

(52) U.S. Cl.
CPC ............ *G06V 20/52* (2022.01); *G06F 3/0481* (2013.01); *G06T 7/20* (2013.01); *G06T 7/70* (2017.01); *G06V 10/225* (2022.01); *G06V 20/40* (2022.01); *G06V 40/10* (2022.01); *G06T 2207/10016* (2013.01); *G06T 2207/30196* (2013.01); *G06T 2207/30232* (2013.01); *G06T 2207/30242* (2013.01)

(58) Field of Classification Search
None
See application file for complete search history.

(56) References Cited

U.S. PATENT DOCUMENTS

| | | | |
|---|---|---|---|
| 11,100,335 B2* | 8/2021 | Winter | G06V 20/41 |
| 11,704,782 B2* | 7/2023 | Wakim | G06V 20/52 |
| | | | 705/5 |
| 2009/0002489 A1* | 1/2009 | Yang | G06V 10/7557 |
| | | | 382/103 |
| 2015/0310458 A1* | 10/2015 | Bernal | G06Q 30/0201 |
| | | | 382/103 |
| 2016/0140397 A1* | 5/2016 | Zhang | G06V 40/103 |
| | | | 382/103 |

(Continued)

*Primary Examiner* — Delomia L Gilliard
(74) *Attorney, Agent, or Firm* — ArentFox Schiff LLP (57) ABSTRACT

A system may be configured to perform enhanced detection of occluded objects in a multiple object detection system. In some aspects, the system may determine a first size of a queue captured in a video frame based on an object detection system and a video capture device, and determine a second size of the queue based on the first size of the queue and a correction model. Further, the system may detect a person at a front of the queue based on an object tracking system, determine a first period of time spent by the person at the front of the queue based on an object tracking system, and estimate a second period of time spent in the queue based at least in part on the first period of time and the second size of the queue.

21 Claims, 5 Drawing Sheets

(56) References Cited

U.S. PATENT DOCUMENTS

| | | | |
|---|---|---|---|
| 2016/0180173 A1* | 6/2016 | Westmacott | G07F 19/207 |
| | | | 382/103 |
| 2016/0191865 A1* | 6/2016 | Beiser | G06V 20/53 |
| | | | 348/156 |
| 2017/0277956 A1* | 9/2017 | Winter | G06F 18/21355 |
| 2019/0026565 A1* | 1/2019 | Ikegami | G06V 10/96 |
| 2020/0134323 A1* | 4/2020 | Oami | H04N 23/60 |
| 2020/0226523 A1* | 7/2020 | Xu | G06V 40/103 |
| 2021/0019528 A1* | 1/2021 | Ghadyali | G06F 11/3409 |
| 2021/0035313 A1* | 2/2021 | Ghadyali | G06T 7/246 |

\* cited by examiner

QUEUE MONITORING IN OCCLUSION CONDITIONS THROUGH COMPUTER VISION

CROSS-REFERENCE TO RELATED APPLICATION

This application claims priority to U.S. Application No. 63/089,949, entitled "QUEUE MONITORING IN OCCLUSION CONDITIONS THROUGH COMPUTER VISION," filed on Oct. 9, 2020, the disclosure of which is incorporated by reference herein in its entirety.

BACKGROUND

The present disclosure relates generally to multiple object detection systems and multiple object tracking systems, and more particularly, to methods and systems for queue monitoring in occlusion conditions through computer vision.

Many retail operators rely on key performance indicators (KPIs) that are based on or associated with queue monitoring. For example, some retail operators utilize queue length and time spent in a queue to gauge operational performance. However, it has proven difficult to determine queue based KPIs from video feed data. In some instances, video capture devices (e.g., cameras) used to capture video feed data may have a head-on view of a queue, which causes occlusion conditions with respect to the customers in the queue. Further, it would be cumbersome to modify the view of multiple video capture devices, and modifying the view of a video capture device may frustrate other uses of the video feed data received from the video capture device. In addition, in some instances, the view of a video capture device may not include the entire queue, and thus be unable to present video feed data representing the state of the queue.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for queue monitoring in occlusion conditions through computer vision. In an aspect, a method queue for monitoring in occlusion conditions through computer vision may comprise determining, based on an object detection system and a video capture device, a first size of a queue captured in a video frame, determining a second size of the queue based on the first size of the queue and a correction model, the correction model being configured to correct an error associated with the object detection system or the video capture device, detecting, based on an object tracking system, a person at the front of the queue, determining, based on an object tracking system, a first period of time spent by the person at the front of the queue, and estimating a second period of time spent in the queue based at least in part on the first period of time and the second size of the queue.

The present disclosure includes a system having devices, components, and modules corresponding to the steps of the described methods, and a computer-readable medium (e.g., a non-transitory computer-readable medium) having instructions executable by a processor to perform the described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provide systems, methods, and apparatuses that provide queue monitoring in occlusion conditions through computer vision. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

In some implementations, one or more problems solved by the present solution is accurate queue monitoring in occlusion conditions through computer vision. For example, this present disclosure describes systems and methods for queue monitoring configured to detect members of the queue in a video feed provided by a video capture device, correct the amount of detected members, identify the length of a time spent by a member at the front of the queue, and determine queue based KPIs using the corrected amount of members in the queue and the identified length of time. The present solution provides improved accuracy for queue monitoring in occlusion conditions that have frustrated traditional applications of computer vision without requiring reinstallation or reconfiguration of the video capture device.

Figure 1:
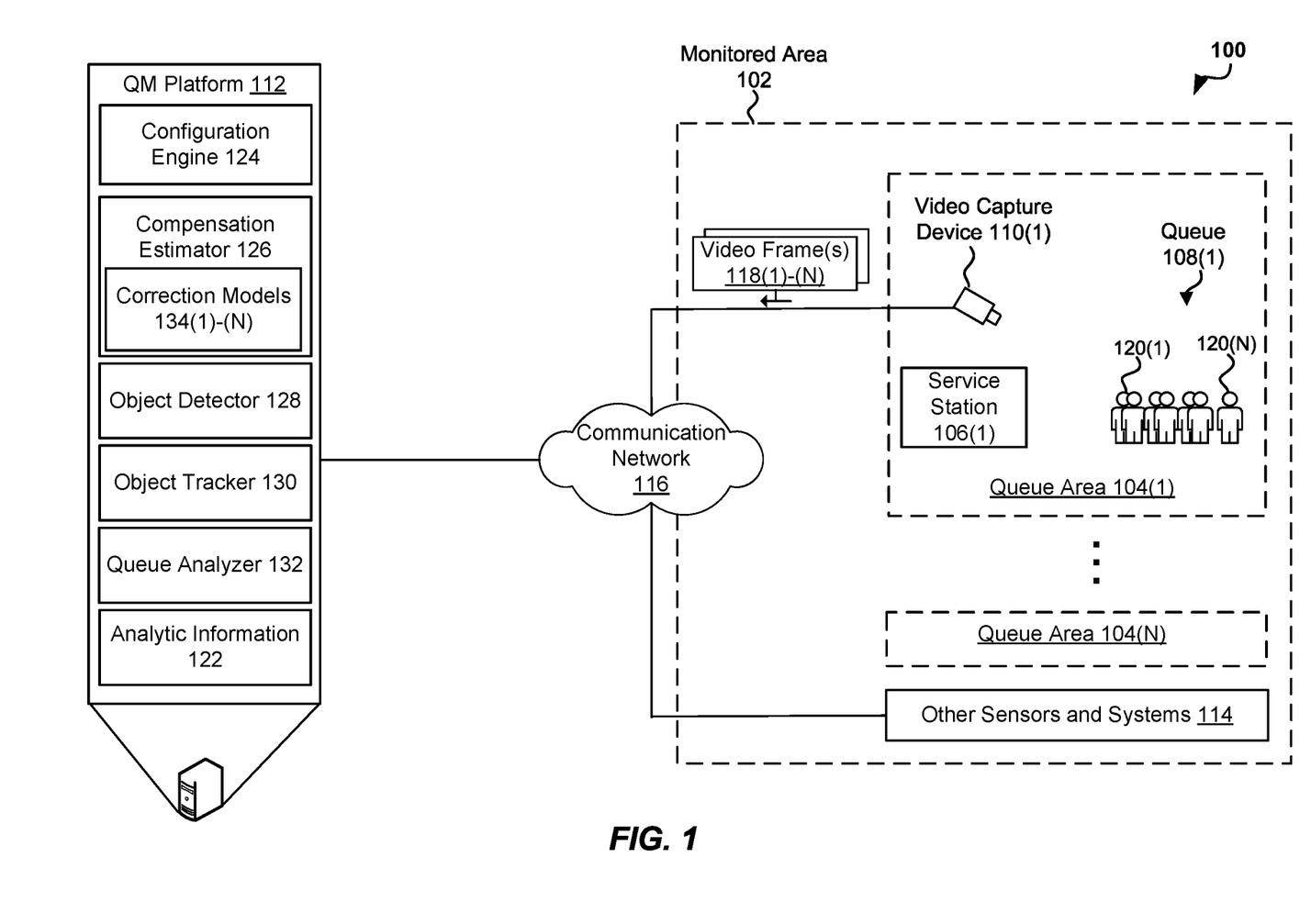
FIG. 1 is a block diagram of an example of a system for queue monitoring in occlusion conditions through computer vision, according to some implementations.

Referring to FIG. 1, in one non-limiting aspect, a system 100 may be configured to perform queue monitoring in occlusion conditions through computer vision in a monitored area 102. As illustrated in FIG. 1, the monitored area 102 may include a plurality of queue areas 104(1)-(N). Further, each queue area 104 may include a service station 106. For example, a first queue area 104(1) may include a first service station 106(1), a second queue area 104(2) may include a second service station 106(2), a Nth queue area 104(N) may include a Nth service station 106(N), and so forth. Some examples of a service station 106 may include a checkout station, a plurality of automated self-checkout devices, one or more kiosks, one or more automated teller machines (ATMs), a customer service location, one or more retail stands (e.g., a concession stand), a security checkpoint, a bathroom, a ticketing station, or any other location where humans may form a queue. As illustrated in FIG. 1, the queue 108 may be formed to access or receive service at the service station 106.

In some aspects, the system 100 may include plurality of video capture devices 110(1)-(N), a queue monitoring (QM) platform 112, other sensors and systems 114 (e.g., a people counter), and a communication network 116. Further, the video capture device 110, the QM platform 112, and the other sensors and systems 114 may communicate via the communication network 116. In some implementations, the communication network 116 may include one or more of a wired and/or wireless private network, personal area network, local area network, wide area network, or the Internet.

In some aspects, the video capture devices 110(1)-(N) may be configured to capture video frames 118(1)-(N) of activity of the queues 108(1)-(N) within the queue areas 104(1)-(N). For instance, the video capture device 110(1) may capture activity of members 120(1)-(N) of the queues 108(1)-(N) in the video frames 118(1)-(N), and send the video frames 118(1)-(N) to the QM platform 112 via the communication network 116. In some examples, the monitored area 102 may be a retail environment and the members 120(1)-(N) of the queue 108(1) may be customers attempting to pay for retail articles at the service station 106(1) or receive customer service at the service station 106(1). Although FIG. 1 illustrates one video capture device 110(1) within the queue area 104(1), in some other implementations each queue area 104(1) may include any number of video capture devices 110.

In some aspects, the QM platform 112 may be configured to analyze a queue 108, and determine analytic information 122 corresponding to activity at the queue 108. For example, the QM platform 112 may be configured to receive the video frames 118(1)-(N) from the video capture device 110(1), and determine analytic information 122 corresponding to activity at the queue 108(1). In some aspects, the analytic information 122 may include an estimated wait time of a member 120(1)-(N) of the queue 108(1), and/or the average wait time of the members 120(1)-(N) of the queue 108(1).

As illustrated in FIG. 1, the QM platform 112 may include a configuration engine 124, a compensation estimator 126, an object detector 128, an object tracker 130, a queue analyzer 132, and the analytic information 122. The configuration engine 124 may be configured to determine the location and direction of the queues 108(1)-(N). For example, the configuration engine 124 may present a graphical user interface to an operator, and receive an indication of the location of the queue 108(1). In some aspects, the configuration engine 124 may present a video frame 118 including an image of the queue area 104(1), and receive user input identifying the location of the queue 108(1) within the queue area 104(1). For instance, the configuration engine 124 may request that the operator draw a perimeter (e.g., a box) around the location of the queue 108(1). In some cases, the configuration engine 124 may request that the operator mark the front of the queue 108(1). Further, in some instances, the queue 108(1) may include one or more turns. As such, the operator may provide user input identifying multiple segments of the queue 108(1). For example, the operator may a draw box around each segment of a queue 108(1). In addition, the configuration engine 124 may receive an indication of the direction of a queue 108 via the graphical interface. For example, the configuration engine 124 may receive user input identifying the direction of the queue 108(1) towards the service station 106(1).

In some other aspects, the configuration engine 124 may dynamically determine the direction and/or the location of the queue 108 within the queue area 104(1). For example, the configuration engine 124 may employ the object detector 128 to detect a location of the members 120 within one or more video frames 118, and identify the determined location as the location of the queue. Further, the configuration engine 124 may employ the object tracker 130 to detect the movements of the members over a plurality of video frames corresponding to an initialization period, and determine the direction of the queue 108(1) based off of the movements. As an example, the object tracker 130 may provide movement representations indicating a distance and direction of movements captured within the plurality of video frames. In addition, the configuration engine 124 may combine (e.g., average) the movement representations to determine the direction of the queue 108(1). In some instances, the configuration engine 124 may dynamically determine the direction and/or location of a queue 108(1) within a queue area 104 when the amount of members 120(1)-(N) in the queue 108(1) is less than a predetermined threshold. Further, the configuration engine 124 may provide the location and/or the direction of the queue 108(1)-(N) to the object detector 128 and the object tracker 130.

The compensation estimator 126 may be configured to determine a bias resulting from the configuration of a video capture device 110 and/or the object detector 128. In particular, the compensation estimator 126 may be configured to determine a correction model 134 to apply to the object detector 128 in view of an occlusion context resulting from the physical installation of a video capture device 110 and the capabilities of the object detector 128. For example, the compensation estimator 126 may determine a first correction model 134(1) for the video capture device 110(1), a second correction model 134(2) for the video capture device 110(2), the Nth correction model 134(N) for the Nth video capture device 110(N), and so forth. The compensation estimator 126 accepts that the video capture devices 110(1)-(N) and the object detector 128 will be unable to accurately determine the length (i.e., headcount) of a queue 108. For example, in some aspects, the video capture device 110(1) may have a head-on view of the queue 108(1) that causes a large amount of occlusion of the members 120(1)-(N) of the queue 108(1), and/or the field of view of the video capture device 110(1) may not include the entire queue 108(1). Moreover, the compensation estimator 126 helps leverage that the object detector 128 can be expected to consistently apply the same bias to the amount of objects detected in a video frame produced by the video capture device 110(1) and/or video capture devices 110 installed in a similar configuration (e.g., orientation, perspective, field of view, location, etc.).

In some aspects, the compensation estimator 126 may train a correction model configured to correct detection error produced by the video capture device 110 and the object detector 128. The correction model may be trained by comparing an estimation of the length of the queue 108 to the actual length of the queue 108 over a period of time to determine a statistical bias representing the detection error of a video capture device 110 and the object detector 128. For example, the correction model may compare the amount of members 120(1)-(N) of the queue 108(1) as detected by the object detector 128 to the actual amount of members of the queue 108(1) in a plurality of video frames 118 capturing activity at the queue 108(1), and determine that the object detector 128 consistently detects eighty percent of the members 120(1)-(N) of the queue 108(1). In some examples, the actual length of the queue 108(1) may be manually determined by an operator counting the members 120(1)-(N) of the queue 108(1) as captured in one or more video frames 118. In some other examples, the actual length of the queue 108(1) may be determined by the other sensors and systems 114 configured to track the amount of people within the queue area 104(1). Further, the correction model 134(1) may determine an estimate of the amount of members 120(1)-(N) in the queue 108(1) based on the identified statistical bias and the amount of members 120(1)-(N) of the queue 108(1) detected by the object detector 128. For instance, if the object detector 128 detects eight members 120(1)-(8) in the queue 108(1), the correction model 134(1) may estimate that the length of the queue 108(1) is ten. Additionally, or alternatively, the correction models 134(1)-(N) may be based on the time of day, one or more attributes of the monitored area 102 or a queue area 104, one or more attributes of the video capture device 110, field of view information, and/or the amount of people within the monitored area 102 and/or a queue area 104. Further, in some examples, the correction model 134(1)-(N) may employ machine learning models or pattern recognition techniques.

The object detector 128 may be configured to detect the objects (e.g., humans) in a queue 108 within the video frames 118(1)-(N). Further, the object detector 128 may be further configured to determine a predicted class (i.e., type or category) of a detected object and confidence score representing the likelihood that the detected object belongs to the class. In some aspects, the object detector 128 may employ one or more machine learning models (e.g., a convolution neural network) to detect objects within the video frames 118(1)-(N). In particular, the object detector 128 may be configured to determine a boundary representation corresponding to each object detected within a video frame 118. For example, the object detector 128 may generate bounding boxes for the members 120(1)-(N) of the queue 108(1) detected within the video frame 118(1). In addition, the object detector 128 may determine the amount of objects within a region of interest corresponding to the identified location of the queue 108(1) provided by the configuration engine 124, and provide the determined amount to the queue analyzer 132.

The object tracker 130 may be configured to generate tracking information indicating the trajectory of the detected objects over the video frames using machine learning models and/or pattern recognition techniques. In particular, the object tracker 130 may receive the boundary representations from the object detector 128, determine if the boundary representations have corresponding boundary representations in one of the preceding frames, and track the movement of the detected object based on the movement of the boundary representations associated with the detected objects across the video frames. Further, the object tracker 130 may be configured to identify the boundary representation corresponding to an object at the front of the queue 108, and determine when the object leaves the queue 108 based on the boundary representations. As such, the object tracker 130 may be configured to determine the amount of time spent by the object at the front of the queue 108.

For example, in some aspects, the object tracker 130 may receive a first plurality of boundary representations corresponding to the members 120(1)-(N) of the queue 108(1) detected in the video frame 118(1) from the object detector 128. Further, the object tracker 130 may determine that a first boundary representation of the first plurality of boundary representations corresponds to the member 120(1) at the front of the queue 108(1) based on the proximity of the boundary representation to the location within the video frame 118(1) identified as the front of the queue 108(1) by the configuration engine 124. Next, the object tracker 130 may receive a second plurality of boundary representations corresponding to the members 120(1)-(N) detected in the video frame 118(2) from the object detector 128. In addition, the object tracker 130 may determine that a second boundary representation of the second plurality of boundary representations corresponds to the member 120(1) at the front of the queue 108(1) based on the proximity of the boundary representation to the location within the queue area 104(1) identified as the front of the queue by the configuration engine 124. If the object tracker 130 determines that first boundary representation and the second boundary representation correspond to the same object (i.e., member 120(1)), the object tracker 130 may determine that the same member is at the front of the queue 108(1). Conversely, if the object tracker 130 determines that first boundary representation and the second boundary representation do not correspond to the same object (i.e., member 120(1)), the object tracker 130 may determine that a different member is at the front of the queue 108(1), and send timing information indicating the length of the time between when a boundary representation corresponding to the member 120(1) was detected at the front of the queue 108(1) and when the object tracker 130 determined that the member 120(1) exited the queue 108(1).

The queue analyzer 132 may be configured to determine an estimated wait time of a queue 108, and/or the average wait time of a queue 108. For example, the queue analyzer 132 may be configured to determine an estimated wait time of the queue 108(1), and/or the average wait time of the members 120(1)-(N) of the queue 108(1). In particular, the queue analyzer 132 may receive the amount of members 120(1)-(N) detected in the queue 108(1) by the object detector 128 and apply the correction model 134(1) determined by the configuration engine 124 to determine the amount of members 120 in the queue 108(1). Further, the queue analyzer 132 may multiply the wait time of the most recent member 120(1) at the front of the queue108(1) by the amount of members 120 in queue 108(1) to estimate the total time spent in the queue 108(1) by that member 120(1). Further, the queue analyzer 132 may keep a running total of time spent in the queue by each member 120 that has departed the queue 108(1), and divide the running total by the amount of members 120 that have left the queue 108(1) to determine the average wait time of the queue 108(1).

Figure 2:
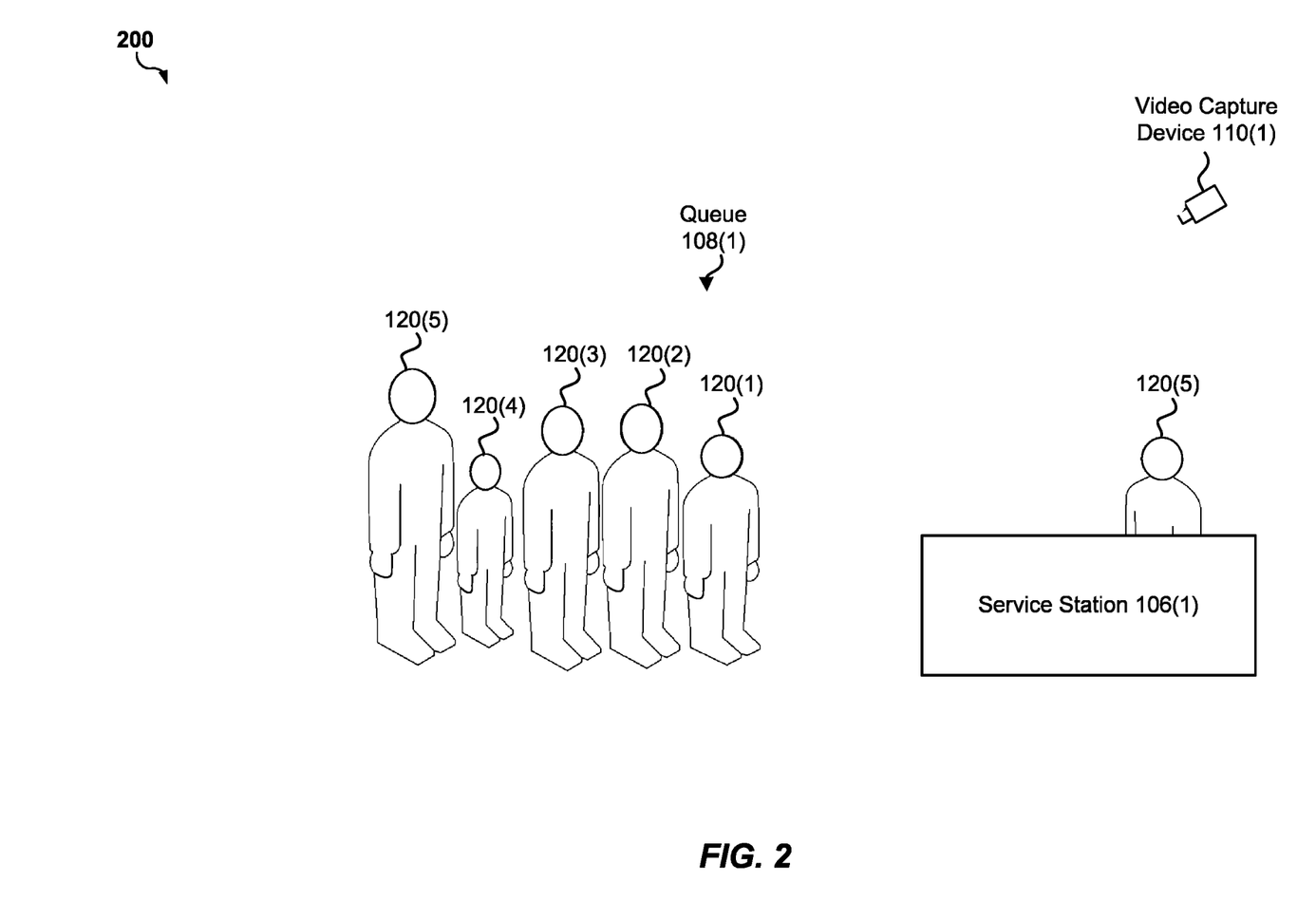
FIG. 2 is an example of a high occlusion condition, according to some implementations.

FIG. 2 is an example 200 of a high occlusion condition, according to some implementations. As illustrated in FIG. 2, the first member 120(1), the second member 120(2), the third member 120(3), the fourth member 120(4), and the fifth member 120(5) may be in the queue 108(1). Further, the video capture device 110(1) may capture a video frame 118(1) of the queue 108(1), and send the video frame 118(1) to the QM platform 112. Further, the object tracker 130 may detect the first member 120(1), the second member 120(2), the third member 120(3), and the fifth member 120(5), while failing to detect the fourth member 120(4) due to fourth member 120(4) being occluded by the third member 120(3). As described in detail herein, in order to correct for the failure by the object detector 128, the queue analyzer 132 may apply a correction model to the amount of members detected by the object detector 128 to accurately estimate the length of the queue 108(1).

Figure 3:
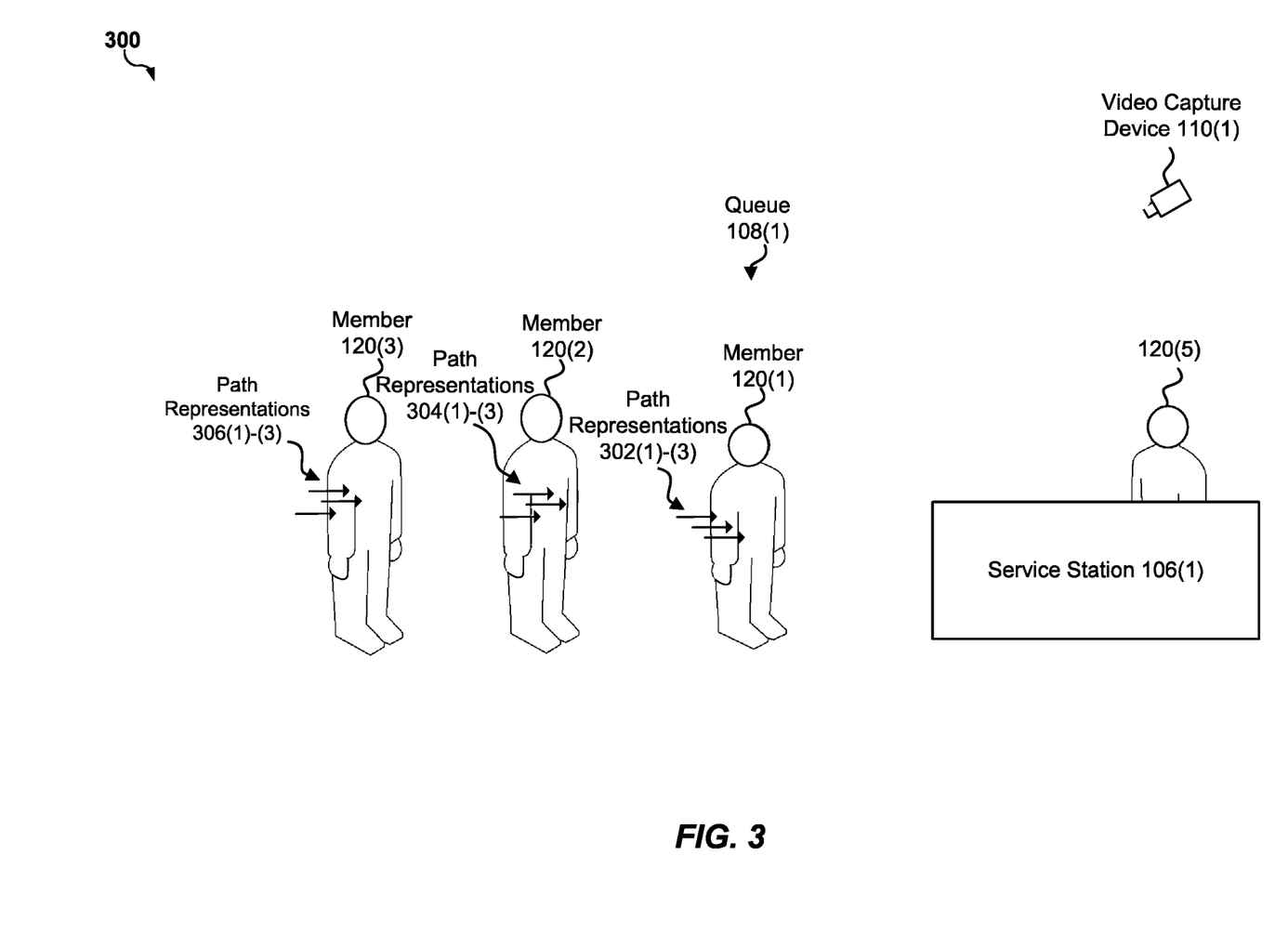
FIG. 3 illustrates an example of path representations used to determine the direction of a queue, according to some implementations.

FIG. 3 illustrates an example 300 of path representations used to determine the direction of a queue, according to some implementations. As illustrated in FIG. 3, the first member 120(1), the second member 120(2), and the third member 120(3) may be in the queue 108(1) during an initialization period. Further, the video capture device 110(1) may capture a plurality of video frames 118(1)-(4) of the queue 108(1), and send the plurality of video frames 118(1)-(4) to the QM platform 112. In addition, the object tracker 130 may track the movement of the members 120(1)-(3) over the plurality of video frames 118(1)-(4) towards the service station 106(1), and generate the path representations 302(1)-(3), 304(1)-(3), and 306(1)-(3) corresponding to the movement of the members 120(1)-(3) between the video frames 118(1)-(4), respectively. As described in detail herein, the configuration engine 124 may determine the direction of the queue 108(1) based on the path representations 302(1)-(3), 304(1)-(3), and 306(1)-(3). For example, the configuration engine 124 may determine the average of the path representations 302(1)-(3), 304(1)-(3), and 306(1)-(3), and identify the direction of the average of path representations 302(1)-(3), 304(1)-(3), and 306(1)-(3) as the direction of the queue 108(1)

Figure 4:
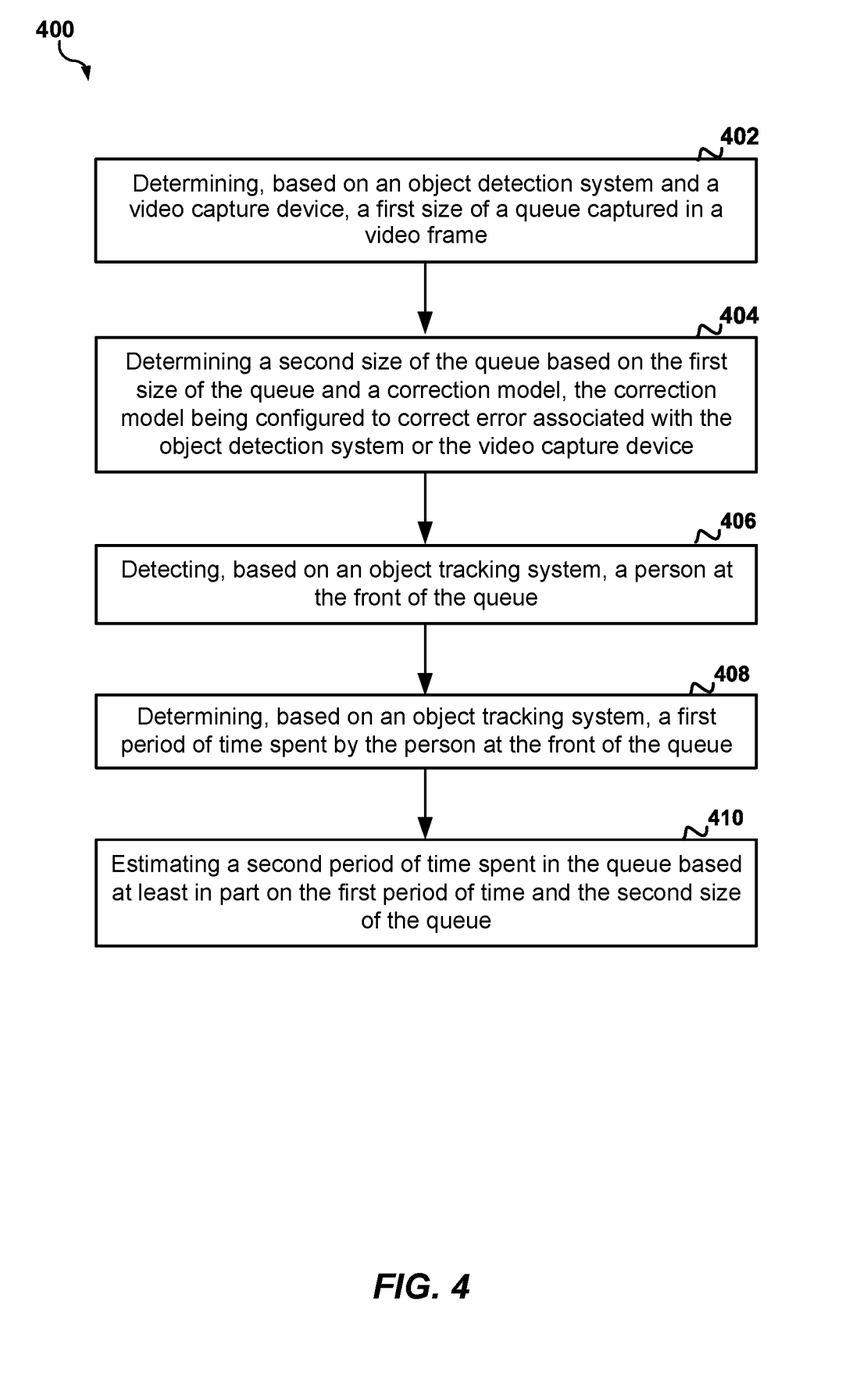
FIG. 4 is a flow diagram of an example method of queue monitoring in occlusion conditions through computer vision, according to some implementations.

Referring to FIG. 4, in operation, the QM platform 112 or computing device 500 may perform an example method 400 for enhancing detection of occluded objects in a MOTS. The method 400 may be performed by one or more components of the QM platform 112, the computing device 500, or any device/component described herein according to the techniques described with reference to FIG. 1.

At block 402, the method 400 includes determining, based on an object detection system and a video capture device, a first size of a queue captured in a video frame. For instance, the QM platform 112 may receive a video frame 118(1) from the video capture device 110, and the object detector 128 may determine length of the queue 108(1) is eight based on detecting the eight members 120(1)-(8) within an area of interest of the video frame 118(1). Accordingly, the QM platform 112, and/or the processor 502 executing the object detector 128 may provide means for determining, based on an object detection system and a video capture device, a first size of a queue captured in a video frame.

At block 404, the method 400 includes determining a second size of the queue based on the first size of the queue and a correction model, the correction model being configured to correct an error associated with the object detection system or the video capture device. For example, the queue analyzer 132 may apply the correction model 134(1) to length of the queue 108(1) as determined by the object detector 128 to determine that ten is a more accurate estimate of the length of the queue 108(1). Accordingly, the QM platform 112, and/or the processor 502 executing the queue analyzer 132 may provide means for determining a second size of the queue based on the first size of the queue and a correction model, the correction model being configured to correct an error associated with the object detection system or the video capture device.

At block 406, the method 400 includes detecting, based on an object tracking system, a person at the front of the queue. For instance, the object tracker 130 may determine that a boundary representation corresponding to the member 120(1) is closest to a location within the queue area 104(1) identified as the front of the queue 108(1) in the video frame 118(1) at a first time instance. Accordingly, the QM platform 112, and/or the processor 502 executing the object tracker 130 may provide means for detecting, based on an object tracking system, a person at the front of the queue.

At block 408, the method 400 includes determining, based on an object tracking system, a first period of time spent by the person at the front of the queue. For example, the object tracker 130 may determine that a boundary representation corresponding to the member 120(1) is no longer the closest boundary representation to the location within the queue area 104(1) identified as the front of the queue 108(1) in the video frame 118(1440) at a second time instance. In addition, the queue analyzer 132 may estimate that the member 120(1) was at the front of the line for a minute based on determining the difference between the first time instance and the second time instance. For example, the queue analyzer 132 may determine that the frame video frame 118(1440) was captured by the video captured device 110(1) one minute after the video frame 118(1) was captured. Accordingly, the QM platform 112, and/or the processor 502 executing the object tracker 130 and the queue analyzer 132 may provide means for determining, based on an object tracking system, a first period of time spent by the person at the front of the queue.

At block 410, the method 400 includes estimating a second period of time spent in the queue based at least in part on the first period of time and the second size of the queue. For example, the queue analyzer 132 may estimate the amount of time the member 120(1) spent in the queue 108(1) based on multiplying the length of the queue, as determined by the queue analyzer 132 via the correction model 134(1), by the time spent by the member 120(1) at the front of the queue 108(1), as determined by the object tracker 130. For instance, the queue analyzer 132 may determine that the member 120(1) spent ten minutes in the queue 108(1). In some aspects, the queue analyzer 132 may request the length of the queue 108(1) after the member 120(1) exits the queue 108 to avoid a person waiting in the queue 108(1) with the member 120(1) from incorrectly affecting the calculation of the amount of time the member 120(1) spent in the queue 108(1). In some other aspects, the object detector 128 and/or object tracker 130 may be configured to identify members 120 of a queue 108 that are waiting in the queue 108 together, and the object detector 128 may be configured to count the members 120 waiting together as a single person waiting in the queue 108. Accordingly, the QM platform 112, and/or the processor 502 executing the queue analyzer 132 may provide means for estimating a second period of time spent in the queue based at least in part on the first period of time and the second size of the queue.

Although FIGS. 1-4 are discussed with respect to detecting and tracking the customers 112(1)-(N), in some other implementations the system 100 may perform enhanced detection and tracking as described in detail herein with respect to the other objects 114(1)-(N), or the customers 112(1)-(N), the other objects 114(1)-(N), and/or other persons located within the monitored area 102.

Figure 5:
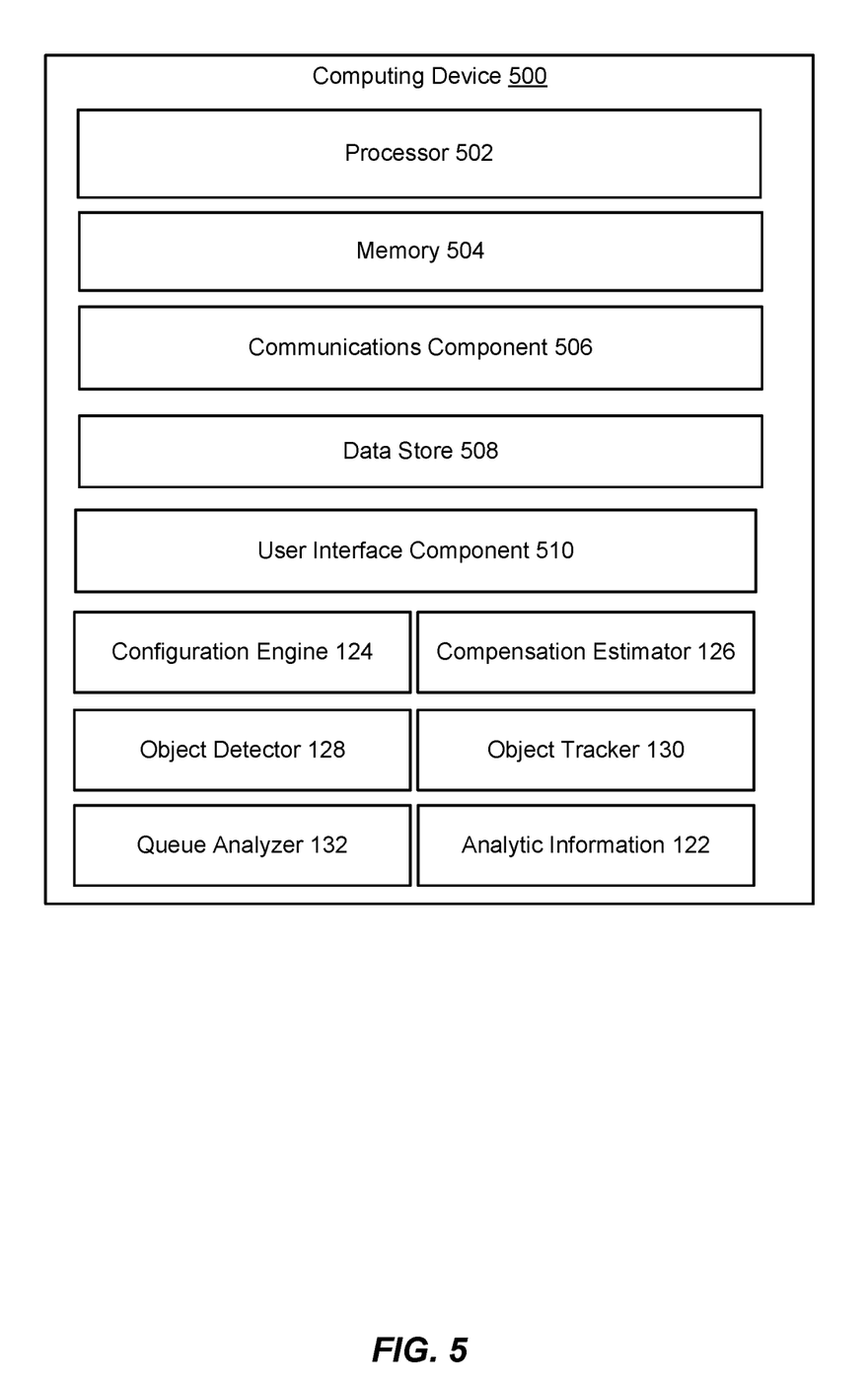
FIG. 5 is block diagram of an example of a computer device configured to implement queue monitoring in occlusion conditions through computer vision, according to some implementations.

Referring to FIG. 5, a computing device 500 may implement all or a portion of the functionality described herein. The computing device 500 may be or may include or may be configured to implement the functionality of at least a portion of the system 100, or any component therein. For example, the computing device 500 may be or may include or may be configured to implement the functionality of the plurality of the video capture devices 110 and/or the QM platform 112. The computing device 500 includes a processor 502 which may be configured to execute or implement software, hardware, and/or firmware modules that perform any functionality described herein. For example, the processor 502 may be configured to execute or implement software, hardware, and/or firmware modules that perform any functionality described herein with reference to the configuration engine 124, the compensation estimator 126, the object detector 128, the object tracker 130, the queue analyzer 132, or any other component/system/device described herein.

The processor 502 may be a micro-controller, an application-specific integrated circuit (ASIC), a digital signal processor (DSP), or a field-programmable gate array (FPGA), and/or may include a single or multiple set of processors or multi-core processors. Moreover, the processor 502 may be implemented as an integrated processing system and/or a distributed processing system. The computing device 500 may further include a memory 504, such as for storing local versions of applications being executed by the processor 502, related instructions, parameters, etc. The memory 504 may include a type of memory usable by a computer, such as random access memory (RAM), read only memory (ROM), tapes, magnetic discs, optical discs, volatile memory, non-volatile memory, and any combination thereof. Additionally, the processor 502 and the memory 504 may include and execute an operating system executing on the processor 502, one or more applications, display drivers, and/or other components of the computing device 500.

Further, the computing device 500 may include a communications component 506 that provides for establishing and maintaining communications with one or more other devices, parties, entities, etc. utilizing hardware, software, and services. The communications component 506 may carry communications between components on the computing device 500, as well as between the computing device 500 and external devices, such as devices located across a communications network and/or devices serially or locally connected to the computing device 500. In an aspect, for example, the communications component 506 may include one or more buses, and may further include transmit chain components and receive chain components associated with a wireless or wired transmitter and receiver, respectively, operable for interfacing with external devices.

Additionally, the computing device 500 may include a data store 508, which can be any suitable combination of hardware and/or software, that provides for mass storage of information, databases, and programs. For example, the data store 508 may be or may include a data repository for applications and/or related parameters not currently being executed by processor 502. In addition, the data store 508 may be a data repository for an operating system, application, display driver, etc., executing on the processor 502, and/or one or more other components of the computing device 500.

The computing device 500 may also include a user interface component 510 operable to receive inputs from a user of the computing device 500 and further operable to generate outputs for presentation to the user (e.g., via a display interface to a display device). The user interface component 510 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 510 may include one or more output devices, including but not limited to a display interface, a speaker, a haptic feedback mechanism, a printer, any other mechanism capable of presenting an output to a user, or any combination thereof.

What is claimed is:

1. A method comprising:
    determining, based on an object detection system and a video capture device, a first size of a queue captured in a video frame;
    determining a second size of the queue based on applying a correction model to the first size of the queue, the correction model being configured to correct a statistical bias associated with the object detection system or the video capture device;
    detecting, based on an object tracking system, a person at a front of the queue;
    determining, based on the object tracking system, a first period of time spent by the person at the front of the queue; and
    estimating a second period of time spent by the person at a non-front position in the queue based at least in part on the first period of time and the second size of the queue.

2. The method of claim 1, further comprising:
    estimating a third period of time spent in the queue, the third period of time corresponding to another person that has exited the queue; and
    determining, based on the second period of time and the third period of time, an average wait time associated with the queue.

3. The method of claim 1, wherein the video frame is a first video frame, and further comprising:
    presenting a graphical user interface displaying a second video frame associated with the queue; and
    receiving, via the graphical user interface, selection of a location of the front of the queue or a direction of the queue.

4. The method of claim 1, further comprising:
  determining a first headcount associated with the object detection system and the video capture device;
  comparing the first headcount to a second headcount; and
  generating the correction model based on the comparing.

5. The method of claim 1, wherein determining the first period of time comprises:
  identifying a bounding representation closest to the front of the queue at a first time instance, the bounding representation corresponding to the person; and
  determining that the bounding representation is no longer closest to the front of the queue at a second time instance, the first period of time equal to a difference between the second time instance and the first time instance.

6. The method of claim 5, wherein the bounding representation is a bounding box.

7. The method of claim 1, further comprising:
  determining, based on a plurality of video frames, a plurality of path representations corresponding to at least one bounding representation corresponding to another person, an individual path representation identifying movement of the another person between a first video frame of the plurality of video frames and a second video frame of the plurality of video frames; and
  determining, based on the plurality of path representations, a location of the front of the queue or a direction of the queue.

8. The method of claim 1, wherein determining the second size of the queue based on applying the correction model to the first size of the queue comprises:
  determine a statistical bias value of the statistical bias based on comparing an estimation of the length of the queue to the actual length of the queue over a period of time; and
  adjust the first size of the queue by the statistical bias value to obtain the second size of the queue.

9. A system comprising:
  a memory storing computer-executable instructions; and
  at least one processor coupled with the memory and configured to execute the computer-executable instructions to:
    determine, based on an object detection system and a video capture device, a first size of a queue captured in a video frame;
    determine a second size of the queue based on applying a correction model to the first size of the queue, the correction model being configured to correct a statistical bias associated with the object detection system or the video capture device;
    detect, based on an object tracking system, a person at a front of the queue;
    determine, based on the object tracking system, a first period of time spent by the person at the front of the queue; and
    estimate a second period of time spent by the person at a non-front position in the queue based at least in part on the first period of time and the second size of the queue.

10. The system of claim 9, wherein the at least one processor is further configured to:
  estimate a third period of time spent in the queue, the third period of time corresponding to another person that has exited the queue; and
  determine, based on the second period of time and the third period of time, an average wait time associated with the queue.

11. The system of claim 9, wherein the video frame is a first video frame, and the at least one processor is further configured to:
  present a graphical user interface displaying a second video frame associated with the queue; and
  receive, via the graphical user interface, selection of a location of the front of the queue or a direction of the queue.

12. The system of claim 9, wherein the at least one processor is further configured to:
  determine a first headcount associated with the object detection system and the video capture device;
  compare the first headcount to a second headcount; and
  generate the correction model based on the comparing.

13. The system of claim 9, wherein to determine the first period of time, the at least one processor is further configured to:
  identify a bounding representation closest to the front of the queue at a first time instance, the bounding representation corresponding to the person; and
  determine that the bounding representation is no longer closest to the front of the queue at a second time instance, the first period of time equal to a difference between the second time instance and the first time instance.

14. The system of claim 13, wherein the bounding representation is a bounding box.

15. The system of claim 9, wherein the at least one processor is further configured to:
  determine, based on a plurality of video frames, a plurality of path representations corresponding to at least one bounding representation corresponding to another person, an individual path representation identifying movement of the another person between a first video frame of the plurality of video frames and a second video frame of the plurality of video frames; and
  determine, based on the plurality of path representations, a location of the front of the queue or a direction of the queue.

16. A non-transitory computer-readable device having instructions stored thereon that, when executed by at least one computing device, cause the at least one computing device to perform operations comprising:
  determining, based on an object detection system and a video capture device, a first size of a queue captured in a video frame;
  determining a second size of the queue based on the first size of the queue and a correction model, the correction model being configured to correct a statistical bias associated with the object detection system or the video capture device;
  detecting, based on an object tracking system, a person at a front of the queue;
  determining, based on the object tracking system, a first period of time spent by the person at the front of the queue; and
  estimating a second period of time spent by the person at a non-front position in the queue based at least in part on the first period of time and the second size of the queue.

17. The non-transitory computer-readable device of claim 16, the operations further comprising:
estimating a third period of time spent in the queue, the third period of time corresponding to another person that has exited the queue; and
determining, based on the second period of time and the third period of time, an average wait time associated with the queue.

18. The non-transitory computer-readable device of claim 16, the operations further comprising:
presenting a graphical user interface displaying a second video frame associated with the queue; and
receiving, via the graphical user interface, selection of a location of the front of the queue or a direction of the queue.

19. The non-transitory computer-readable device of claim 16, wherein determining the first period of time comprises:
determining a first headcount associated with the object detection system and the video capture device;
comparing the first headcount to a second headcount; and
generating the correction model based on the comparing.

20. The non-transitory computer-readable device of claim 16, wherein determining the first period of time comprises:
identifying a bounding representation closest to the front of the queue at a first time instance, the bounding representation corresponding to the person; and
determining that the bounding representation is no longer closest to the front of the queue at a second time instance, the first period of time equal to a difference between the second time instance and the first time instance.

21. The non-transitory computer-readable device of claim 16, the operations further comprising:
determining, based on a plurality of video frames, a plurality of path representations corresponding to at least one bounding representation corresponding to another person, an individual path representation identifying movement of the another person between a first video frame of the plurality of video frames and a second video frame of the plurality of video frames; and
determining, based on the plurality of path representations, a location of the front of the queue or a direction of the queue.

\* \* \* \* \*